United States Patent [19]

Tanaka

[11] Patent Number: 5,751,360
[45] Date of Patent: May 12, 1998

[54] CODE AMOUNT CONTROLLING METHOD FOR CODED PICTURES

[75] Inventor: Mitsumasa Tanaka, Tokyo, Japan

[73] Assignee: NEC Corporation, Tokyo, Japan

[21] Appl. No.: 680,842

[22] Filed: Jul. 16, 1996

[30] Foreign Application Priority Data

Jul. 18, 1995 [JP] Japan .................................. 7-181666

[51] Int. Cl.⁶ .................................................. H04N 7/12
[52] U.S. Cl. .................................. 348/409; 348/419
[58] Field of Search .................... 348/384, 390, 348/401, 405, 409, 412, 415, 700, 699

[56] References Cited

U.S. PATENT DOCUMENTS

| | | | |
|---|---|---|---|
| 5,231,484 | 7/1993 | Gonzales et al. | 348/700 |
| 5,283,646 | 2/1994 | Bruder . | |
| 5,565,920 | 10/1996 | Lee et al. | 348/699 |
| 5,606,371 | 2/1997 | Klein Gunnewiek et al. | 348/405 |
| 5,617,150 | 4/1997 | Nam et al. | 348/700 |

FOREIGN PATENT DOCUMENTS

| | | |
|---|---|---|
| 0705040 | 4/1996 | European Pat. Off. . |
| 4-266285 | 9/1992 | Japan . |

OTHER PUBLICATIONS

Test Model 5, Draft Revision 2, Apr. 7, 1993, pp. 54–58.
Liang-Wei Lee et al, "On the Error Distribution and Scene Change for the Bit Rate Control of MPEG", *IEEE Transactions on Consumer Electronics*, vol. 39, No. 3, Aug. 1993, pp. 545–554.

*Primary Examiner*—Amelia Au
*Attorney, Agent, or Firm*—Sughrue, Mion, Zinn, Macpeak & Seas, PLLC

[57] ABSTRACT

The invention provides a code amount controlling method wherein, when code amount control is performed in units of a GOP, data do not remain in a buffer even if data with which a moving picture comes to an end intermediately of the last GOP are compressed. A control parameter setting section gets the number of frames from among all frames of picture data of an object of compression for which coding processing has not been performed, gets the number of frames in one GOP, and discriminates from the remaining frame number and the frame number in the GOP whether or not coding processing comes to an end intermediately of the last GOP. When coding processing comes to an end intermediately of the last GOP, the last GOP and a directly preceding GOP are coupled to vary the frame structure, and an aimed code amount is calculated. Also another method wherein an aimed code amount of the last GOP is compulsorily determined making use of an aimed code amount of the preceding GOP may be utilized. Using the thus obtained aimed code amount, a Q-scale of the macroblocks is calculated and compression coding is performed.

6 Claims, 15 Drawing Sheets

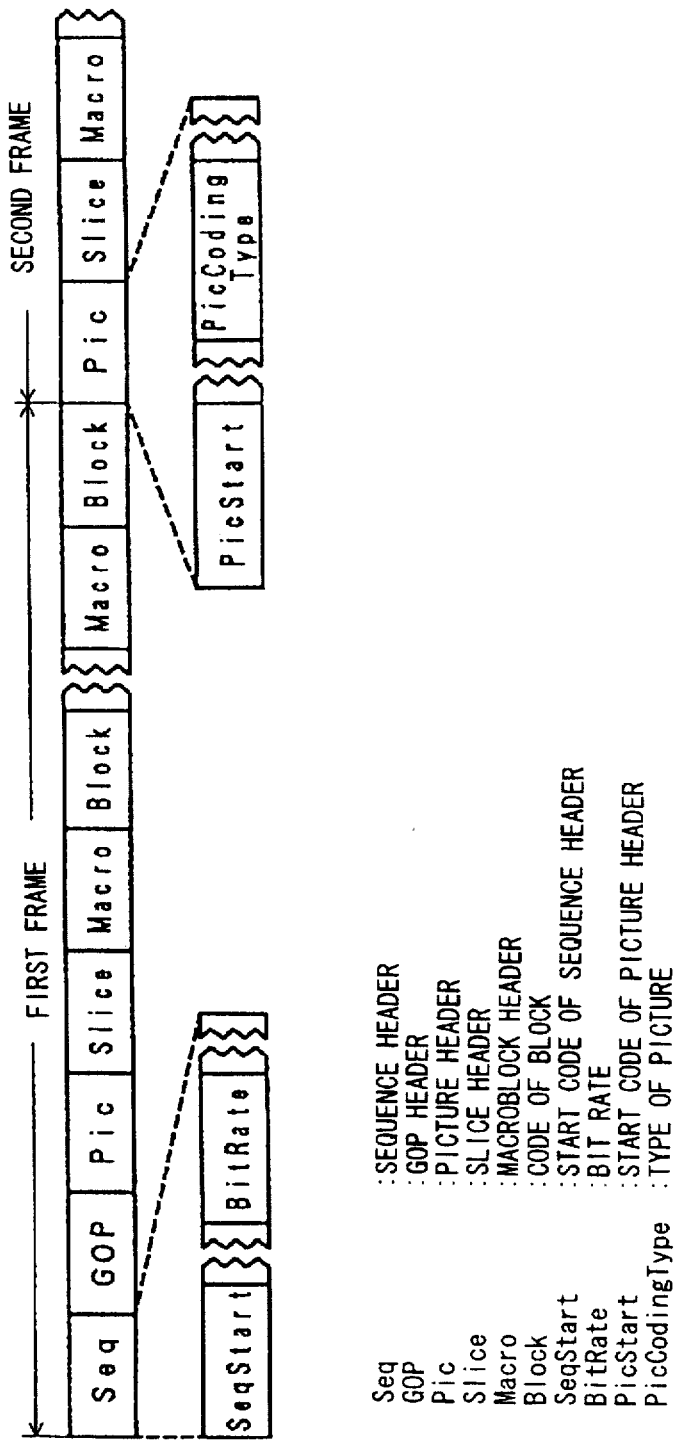

CODE AMOUNT CONTROLLING METHOD FOR CODED PICTURES

BACKGROUND OF THE INVENTION

1. Field of the Invention

This invention relates to a code amount controlling method for coded pictures, and more particularly to a method of controlling the amount of codes in units of a GOP.

2. Description of the Related Art

When a picture signal is recorded as digital data onto a recording medium such as a CD-ROM, a hard disk or a magnetic tape, since the amount of data is very large, the data are usually recorded after they are compression coded.

Although various picture compression coding methods have been proposed, transform coding which employs an orthogonal transform which efficiently makes use of correlations of pictures in a two-dimensional space are used popularly. Particularly, a coding system based on the DCT (Discrete Cosine Transform) as an orthogonal transform is adopted by coding systems of international standards such as the JPEG (Joint Photographic Expert Group) as color still picture standards or moving picture coding standards for storage media (MPEG: Moving Picture Expert Group).

Coding of a picture signal by a conventional coding system based on the DCT will be described by way of an example of the MPEG. FIG. 8 is a block diagram showing an example of a conventional picture coding apparatus. Referring to FIG. 8, the conventional picture coding apparatus shown receives picture data of an object of compression as input data thereto from a picture inputting section 31. The inputted picture data are divided into two-dimensional blocks of 8 pixels×8 pixels or the like by a pre-processing section 32. Then, movements of blocks between two adjacent frames are detected from the data from the pre-processing section 32 by a motion detection section 33. Then, the data are compressed by a DCT section 34, a quantization section 35 and a variable length coding section 36. Further, in order to perform inter-frame prediction, the quantized data from the quantization section 35 are decompressed by a dequantization section 39 and an inverse DCT section 40, and resulting picture data are stored into a frame buffer 41. A compressed picture is outputted from a picture outputting section 37.

In this manner, any coding apparatus which is based on the MPEG as international standards can produce a coded picture signal conforming to the MPEG. However, since the amount of codes generated is different depending upon a design pattern of picture data of an object of compression, when compressed picture data are decompressed using a CPU (central processing unit) of a low processing speed, there is the possibility that the picture data may not be reproduced smoothly.

Therefore, various methods have been proposed conventionally wherein compression is performed while controlling the amount of codes so that, upon decompression, the compressed data may be reproduced smoothly.

For example, in a moving picture data compression apparatus disclosed in Japanese Patent Laid-Open Application No. Heisei 4-266285, when inter-frame predictive coding cannot be performed upon scene change or the like and it is estimated that the amount of codes to be generated increases, high frequency components of an input picture signal are removed and only low frequency components are transmitted to the DCT section 34 to decrease the generated code amount to transmit pictures for one frame rapidly.

FIG. 2 is a block diagram of a picture decoding apparatus corresponding to the coding apparatus of FIG. 8. Referring to FIG. 2, the picture decoding apparatus shown includes an picture inputting section 21 for inputting compressed picture data of an object of decompression, a buffer 22 for temporarily storing the compressed picture data to allow calculation processing, a variable length decoding section 23 for decompressing the compressed picture data, a dequantization section 24, an inverse DCT section 25, a frame buffer 27 for storing the decompressed data for one frame, a motion compensation section 28 for adding adjacent frames and difference values to produce picture data, a post-processing section 26 for re-arranging frames in order of the time and deblocking the blocks of the frames to restore original frames, and a picture outputting section 29.

Here, a variation in state of the buffer 22 when code amount control is performed in units of a GOP will be described with reference to FIGS. 5 to 7. In the graph of FIG. 5, the axis of ordinate indicates the occupation amount of coded data inputted to the buffer 22 of FIG. 2, and the axis of abscissa indicates the time when coded data for one frame are inputted. Further, the buffer size signifies a maximum capacity of the buffer 22. When the inputted coded data overflows from the buffer 22, since data necessary for decompression become missing or drop, the data cannot be reproduced regularly.

FIG. 5 indicates a variation in state of the buffer 22 when all frames have a same structure. When code amount control is performed in units of a GOP, the code amount in the buffer is initialized for each GOP as seen in FIG. 5.

However, when moving picture data come to an end intermediately of the last GOP as seen in FIG. 6, there is the possibility that some data may remain in the buffer 22. In FIG. 6, reference character I denotes an I picture of the MPEG, B denotes a B picture, and P denotes a P picture.

Further, when some other MPEG data are coupled to such data as seen in FIG. 6, there is the possibility that the buffer 22 may overflow as resulting data are not accommodated in the buffer 22 sufficiently as seen in FIG. 7.

Thus, the conventional code amount controlling method wherein the code amount is controlled in units of a GOP has a problem in that, when data with which a moving picture comes to an end intermediately of the last GOP are compressed, some data remains in the buffer. Further, when such compressed data are edited and coupled, there is the possibility that the buffer may overflow.

SUMMARY OF THE INVENTION

It is an object of the present invention to provide a code amount controlling method wherein, when code amount control is performed in units of a GOP, data do not remain in a buffer even if data with which a moving picture comes to an end intermediately of the last GOP are compressed.

In order to attain the object described above, according to the present invention, there is provided a code amount controlling method for a coded picture signal wherein an intra-frame coded picture is produced by dividing the code picture signal into a plurality of blocks, performing discrete cosine transform for each of the blocks, quantizing a transform output, and variable length coding the thus quantized transform output to produce an intra-frame coded picture, whereas an inter-frame coded picture is produced by detecting, for each of the blocks, a block with which a difference of a current frame from another frame preceding in time to the current frame or from frames preceding and following in time to the current frame exhibits a low value, performing motion compensation for the block, performing discrete cosine transform for difference values between blocks of the current frame and motion compensated blocks, quantizing a transform output, and variable length coding the quantized transform output, and a plurality of GoPs each of which is a group of frames having a frame structure wherein inter-frame coded pictures successively appear by a plurality of frames after an intra-frame coded picture are produced successively, wherein a frame structure of each of the GoPs is discriminated to detect whether or not the frame structure of the last GOP is different from the frame structure of the other GoPs and coding processing comes to an end intermediately of the last GOP.

Preferably, when the last GOP has a frame structure wherein coding processing comes to an end intermediately of the last GOP, the last GOP and a directly preceding GOP are coupled to reduce the amount of codes to be generated.

Or, when the last GOP has a frame structure wherein coding processing comes to an end intermediately of the last GOP, an aimed code amount of the last GOP may be calculated from an aimed code amount of a directly preceding GOP to reduce the number of codes to be generated.

In the code amount controlling method, it is discriminated that coding processing comes to an end intermediately of the last GOP of picture data of an object of compression, and a frame structure or an aimed code amount is determined. Consequently, the code amount can be controlled so that it may be initialized in each GOP. As a result, coded pictures can be reproduced without leaving data in a buffer which is used upon decompression.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 4 is a diagrammatic view illustrating a format of a picture signal conforming to the MPEG;

DESCRIPTION OF THE PREFERRED EMBODIMENT

Figure 1:
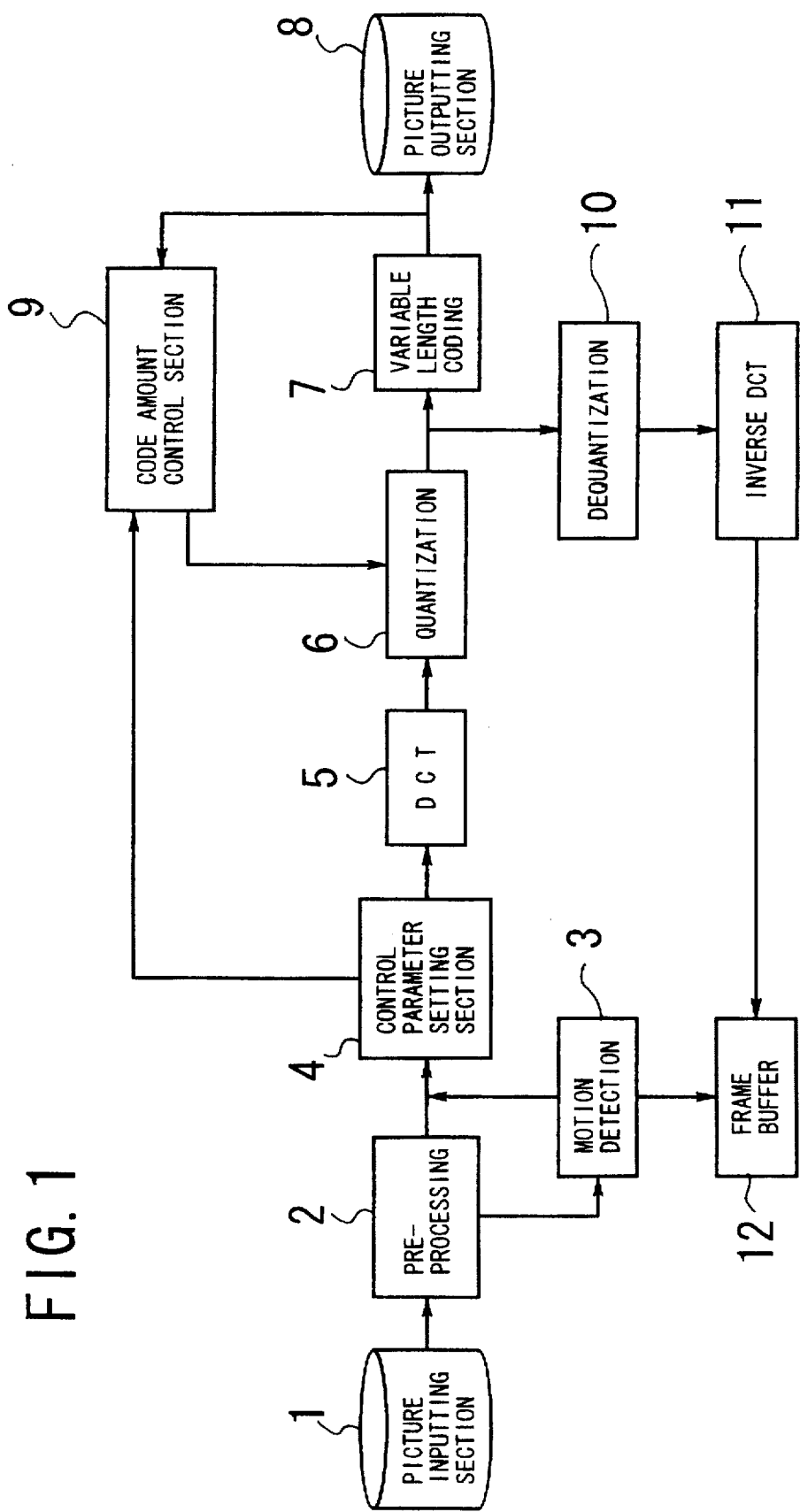
FIG. 1 is a block diagram of a coding apparatus to which a code amount controlling method according to the present invention is applied.
Figure 2:
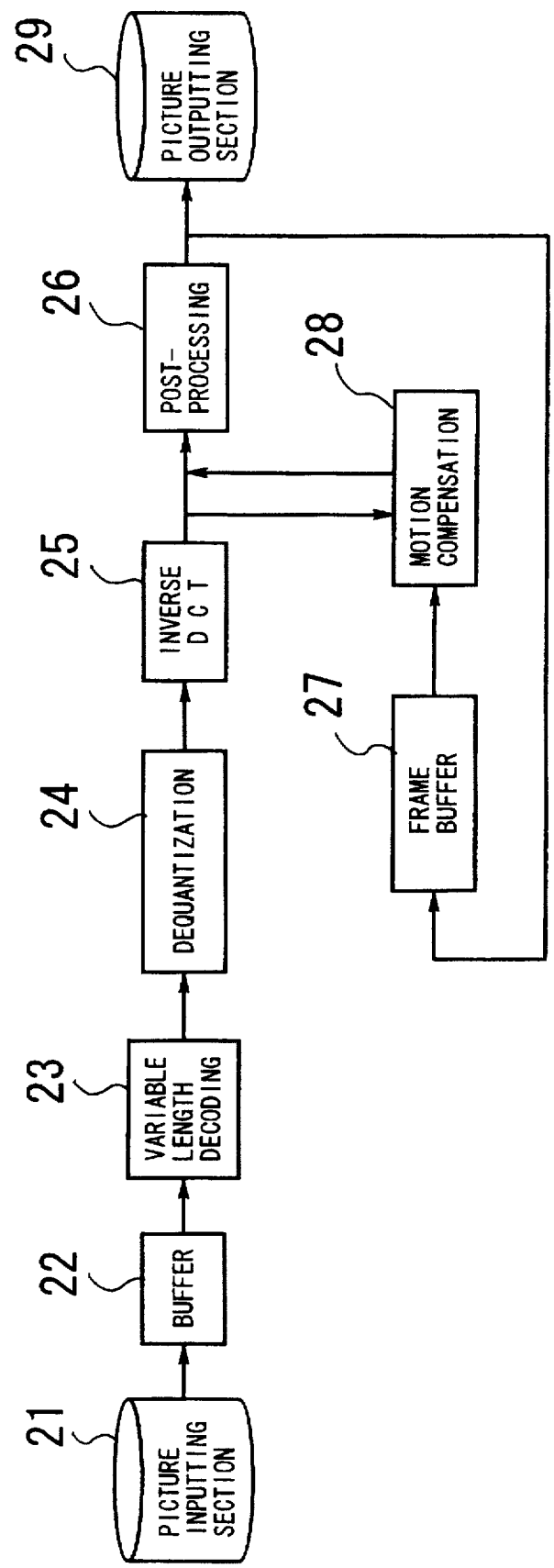
FIG. 2 is a block diagram showing a general construction of a conventional decoding apparatus.

Referring to FIG. 1, there is shown in block diagram a picture coding apparatus to which a code amount controlling method according to the present invention is applied. The picture coding apparatus shown includes a picture inputting section 1 for inputting picture data of an object of compression, a pre-processing section 2 for dividing the inputted picture data into two-dimensional blocks of 8 pixels×8 pixels or the like, a motion detection section 3 for detecting motion of blocks between adjacent frames, a control parameter setting section 4 for determining a frame structure, a method of setting quantization coefficients and so forth, a DCT section 5 for discrete cosine transforming the picture data having been divided into blocks, a quantization section 6 for quantizing a result of the discrete cosine transform by the DCT section 5, a variable length coding section 7 for variable length coding a result of the quantization of the quantization section 6, a code amount control section 9 for determining quantization coefficients, a dequantization section 10 for decompressing a compressed picture, an inverse DCT section 11, a frame buffer 12 for storing the decompressed data for one frame, and a picture outputting section 8 for outputting the compressed picture.

Figure 3A:
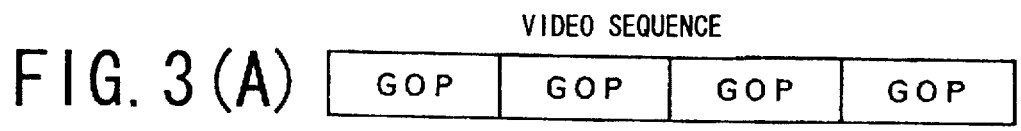
FIGS. 3(A) to 3(F) are diagrammatic views illustrating a hierarchical structure of a coding format of the MPEG.
Figure 3B:
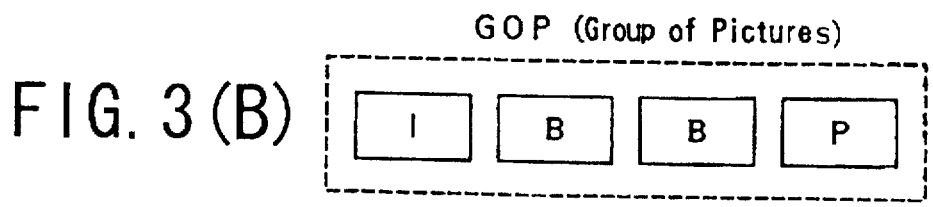

The picture coding apparatus shown in FIG. 1 outputs inputted picture data as compression pictures conforming to the MPEG. Thus, a hierarchical structure of a code format of the MPEG will be described with reference to FIG. 3. In the MPEG, the uppermost layer is a sequence of moving pictures (video sequence) and is formed from a plurality of groups of pictures (GoPs) as seen from FIG. 3(A). One GOP is formed from a plurality of frames (pictures) as seen in FIG. 3(B). The GOP is composed of three kinds of pictures including an I picture which is an intra-frame coded picture, a P picture which is an inter-frame coded picture predicted from another frame preceding in time and coded already, and a B picture which is an inter-frame coded picture predicted from two frames preceding and following the picture.

Generally, the I picture has a characteristic that the amount of codes is large while the P picture and the B picture have another characteristic that the amount of codes is small.

Figure 3C:
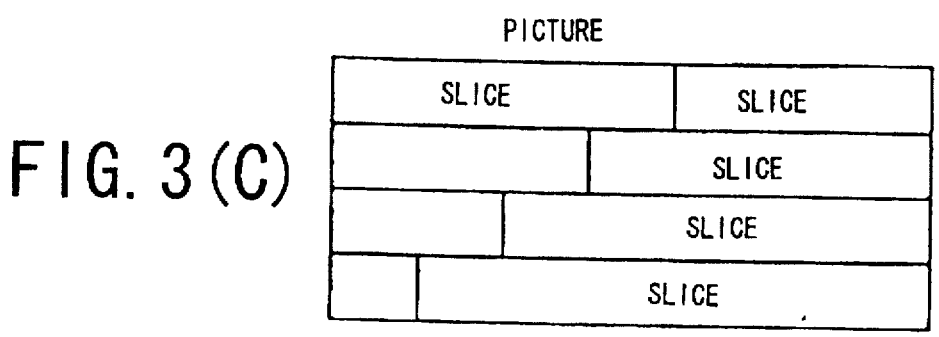
Figure 3D:
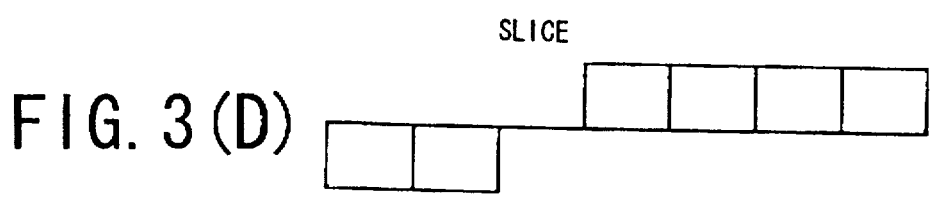
Figure 3E:
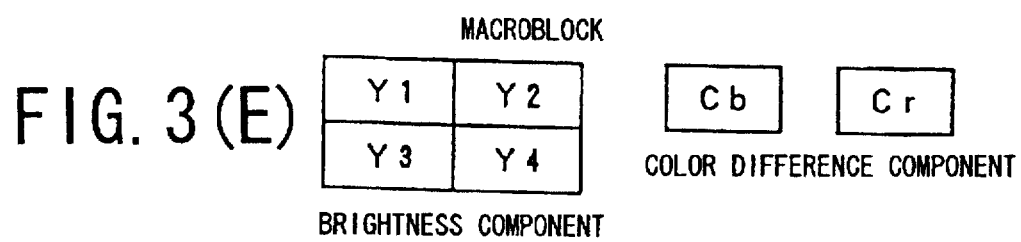

Each picture is divided into or composed of a plurality of slices of arbitrary regions as seen in FIG. 3(C). Each slice is composed of a plurality of macroblocks arranged from the left to the right or from above to below as seen in FIG. 3(D). Each macroblock is composed of totalling six blocks including four adjacent brightness component blocks Y1 to Y1 and a single color difference component block Cb and another color difference component block Cr which correspond in position to the brightness component blocks Y1 to Y4 as seen in FIG. 3(E).

Figure 3F:
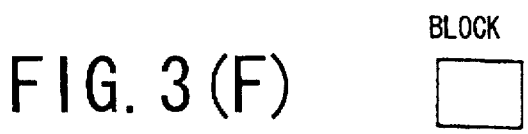
Figure 5:
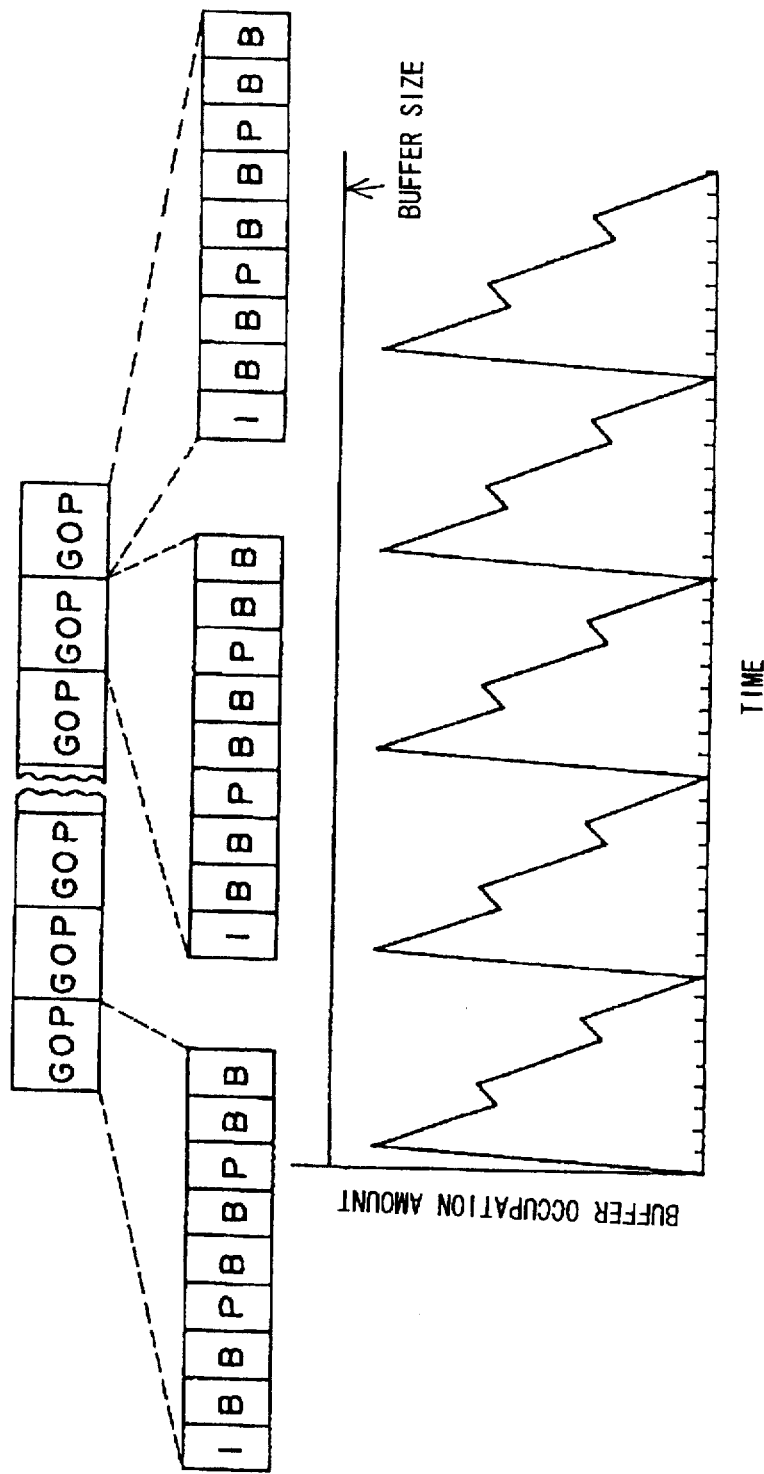
FIGS. 5 to 7 are diagrammatic views illustrating different variations of the occupation amount of a buffer shown in FIG. 2.
Figure 6:
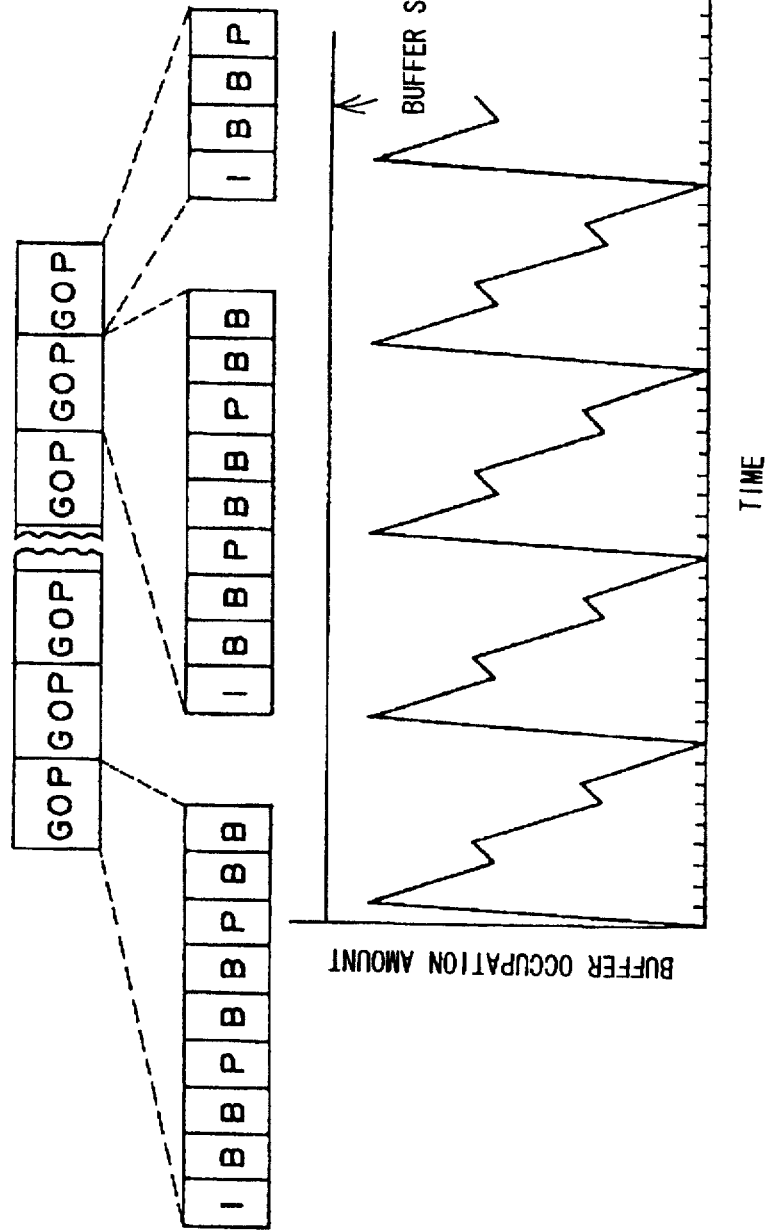
Figure 7:
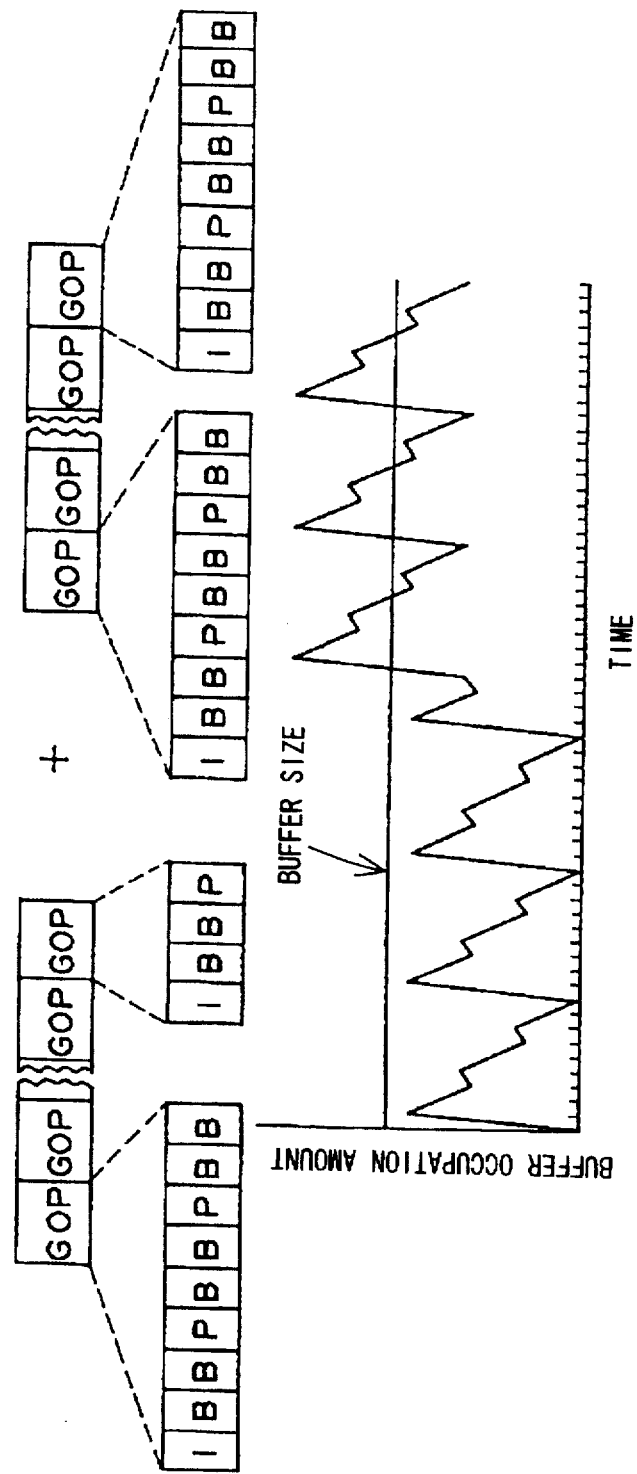
Figure 8:
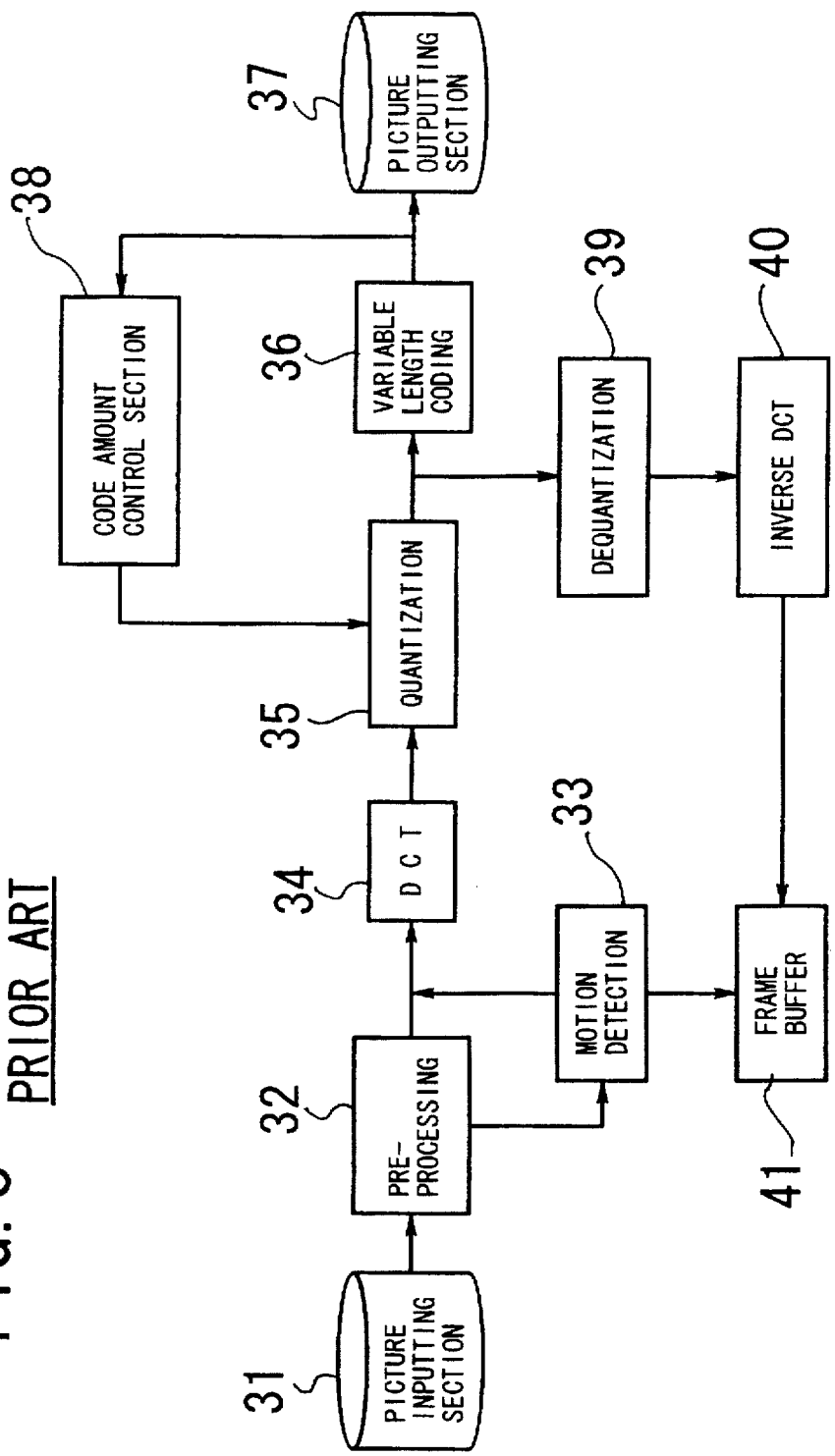
FIG. 8 is a block diagram showing a general construction of a conventional picture coding apparatus.

Further, each block is composed of 8 pixels×8 pixels as seen in FIG. 3(F). The block is the minimum unit in coding and is a processing unit of the DCT. It is to be noted that the minimum unit in motion prediction compensation is a macroblock.

Subsequently, the format of input picture codes conforming to the MPEG will be described with reference to FIG. 4. An input picture is composed of, for each layer, a sequence header Seq, a GOP header Gop added for each GOP, a picture header Pic for identification of each picture, a slice header Slice for identification of each slice, a macroheader Macro for identification of each macroblock, and a code Block of a block.

Here, the sequence header Seq arranged only at the top of input picture codes, that is, at the top of the first frame, defines SeqStart indicating a start code of the sequence header, BitRate indicating a rate at which data are transmitted from the buffer 22 to the variable length decoding section 23, and so forth.

Meanwhile, the picture header defines PicStart indicating a start code of the picture header, PicType indicating that the picture type is the I picture, the P picture or the B picture, and so forth.

Figure 9:
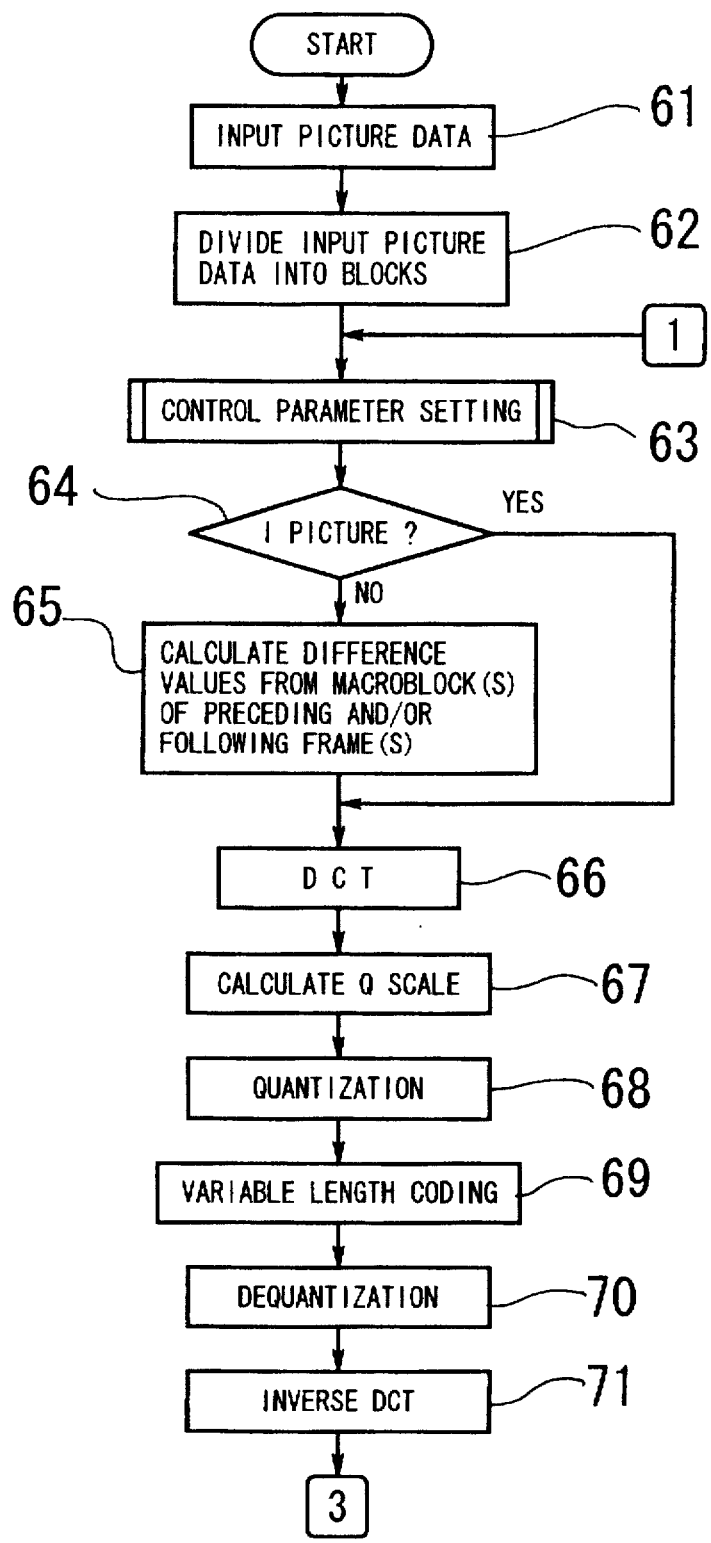
FIGS. 9 and 10 are flow charts illustrating operation of the coding apparatus of FIG. 1.
Figure 10:
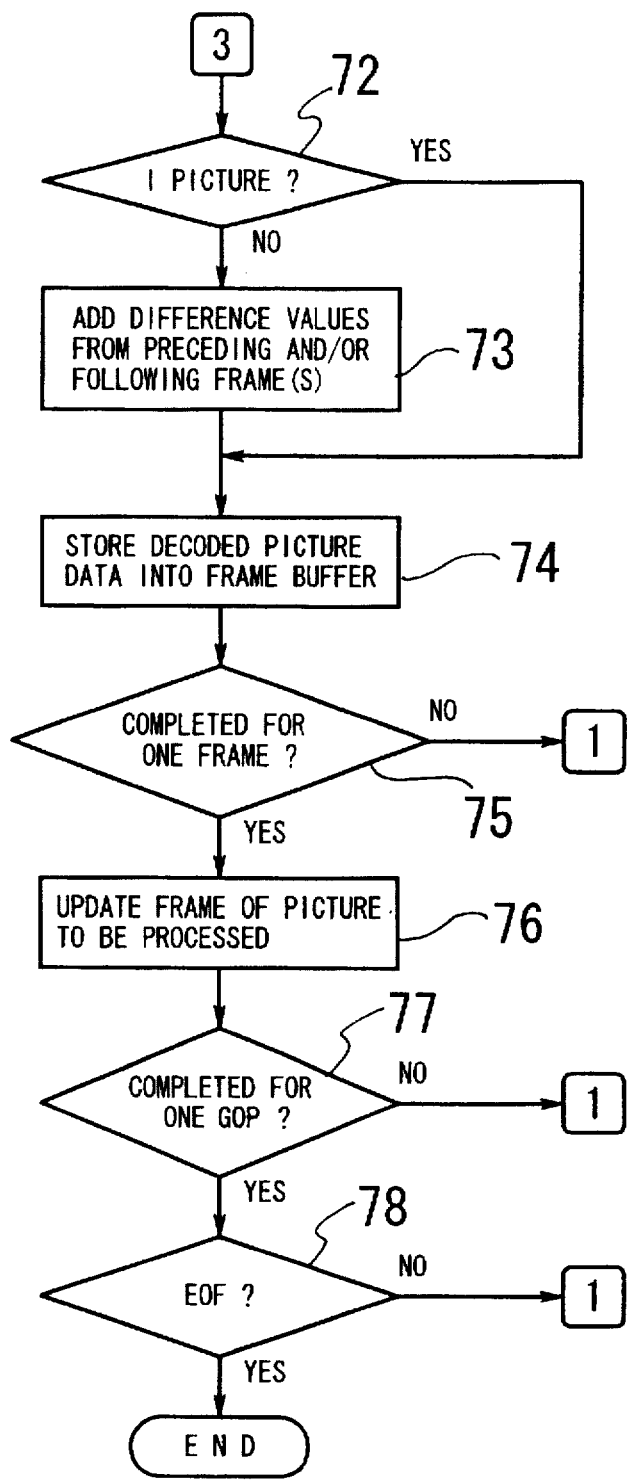

Subsequently, operation of the picture coding apparatus of FIG. 1 when picture data of an object of compression are inputted will be described with reference to the flow charts of FIGS. 9 and 10. Referring first to FIG. 9, in the code amount controlling method of the present invention, picture data of an object of compression are first inputted to the picture inputting section 1 (step 61). Then, the inputted picture data are divided into blocks of 8 pixels×8 pixels or the like by the pre-processing section 2 (step 62).

Then, in order to perform optimum code amount control, a frame structure and a setting method for quantization coefficients are determined by the control parameter setting section 4 (step 63). Then, it is discriminated whether or not a current macroblock is of an intra-frame coded picture (I picture) (step 64). If the current macroblock is of an inter-frame coded picture (P picture or B picture), then difference values of the current macroblock from the macroblock of the preceding frame or the macroblocks of the preceding and following macroblocks stored in the frame buffer 12 are calculated by the motion detection section 3 (step 65), and then DCT is performed for the current macroblock by the DCT section 5 (step 66). But if the current macroblock otherwise is of an I picture in step 64, then DCT is immediately performed for the one macroblock by the DCT section 5 (step 66).

Thereafter, using the frame structure and the quantization coefficient setting method obtained in step 63, a Q scale is determined by the code amount control section 9 (step 67). Then, using the Q scale obtained in step 67, quantization for the current macroblock is performed by the quantization section 6 (step 68). Then, variable length coding for the current macroblock is performed by the DCT section 5 (step 69).

Then, in order to allow inter-frame coding, dequantization for the current macroblock is performed by the dequantization section 10 (step 70). Then, referring now to FIG. 10, inverse DCT for the current macroblock is performed by the inverse DCT section 11 (step 71). Thereafter, it is checked whether or not the current macroblock is of an inter-frame coded picture (step 72). If the current macroblock is of an inter-frame coded picture, then addition of the difference values from the preceding frame or the preceding and following frames stored in the frame buffer 12 to the current macroblock is performed by the motion detection section 3 (step 73). Then, the thus decoded picture data for the current macroblock are stored into the frame buffer 12 (step 74). On the other hand, if the current macroblock is of an intra-frame coded picture in step 72, then the picture data of the macroblock are immediately stored into the frame buffer 12 (step 74).

Thereafter, it is checked whether or not processing for one frame has been completed (step 75). If processing for one frame has not been completed, then the control sequence returns to step 63. On the contrary if processing for one frame has been completed, then a frame for which coding processing is to be performed is updated (step 76). Then, it is checked whether or not processing for one GOP has been completed (step 77). If processing for one GOP has not been completed, then the control sequence returns to step 63. But if processing for one GOP has been completed, then it is checked whether or not the last end of the file has been reached (step 78). If the last end of the file has not been reached, then the control sequence returns to step 63. But if the last end of the file has been reached, then the coding processing is ended.

Figure 11:
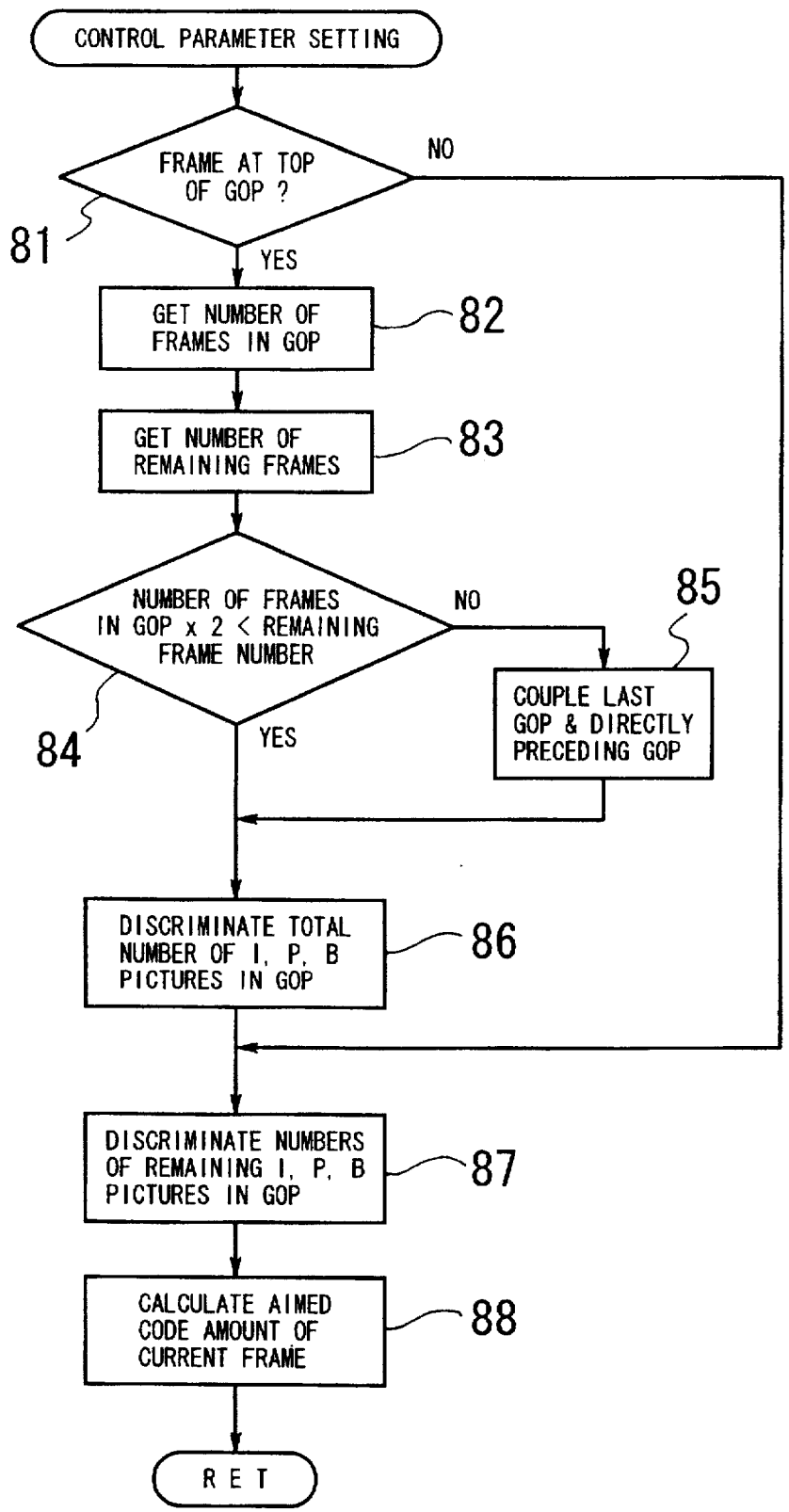
FIG. 11 is a flow chart illustrating a control parameter setting process of the coding apparatus of FIG. 1.

Subsequently, operation of the control parameter setting section when the frame structure of a GOP is to be changed will be described with reference to the flow chart of FIG. 11. At first, it is checked whether or not a current frame is the top frame in a GOP (step 81). If the current frame is the top frame in the GOP, then the control parameter setting section gets the number of frames in the GOP (step 82). Then, the control parameter setting section gets the number of remaining frames to which coding processing has not been performed as yet from among all frames of picture data of an object of compression (step 83).

Figure 12:
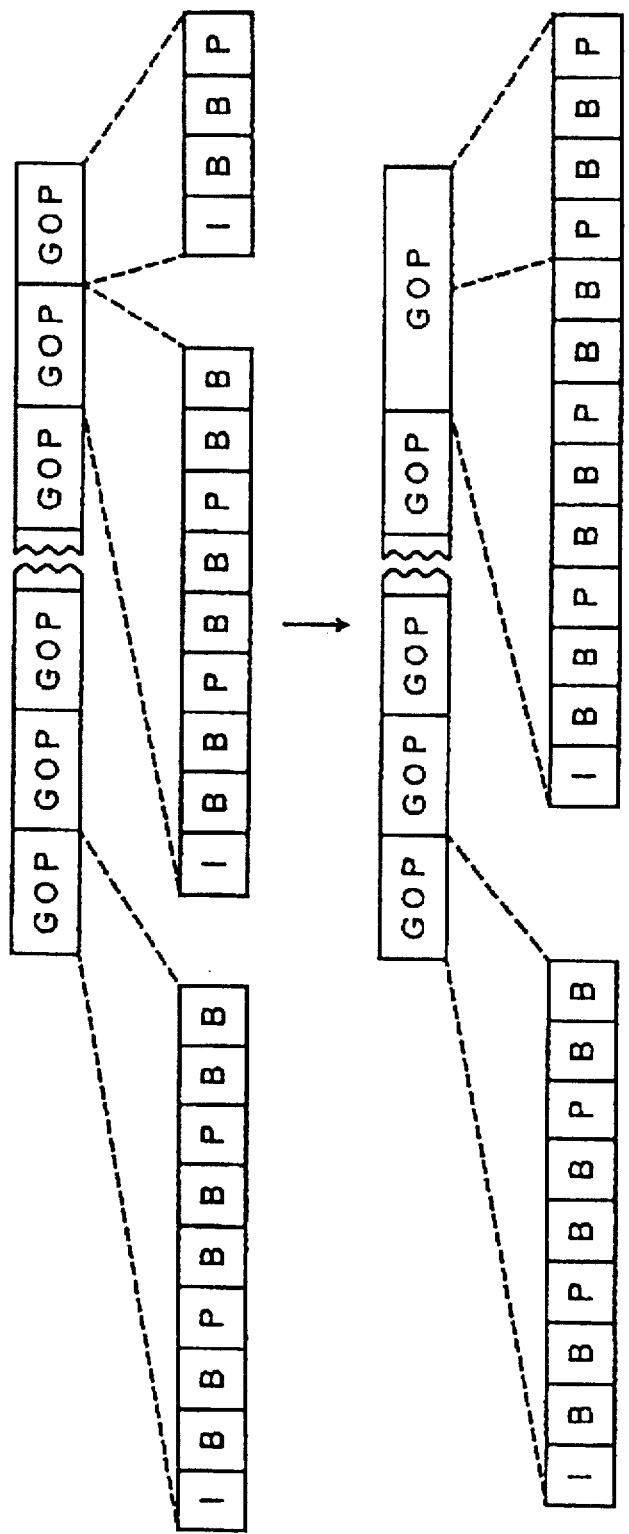
FIG. 12 is a diagrammatic view illustrating a manner in which the last GOP and the second last GOP are coupled.

Then, the control parameter setting section compares a value equal to twice the number of frames in the GOP obtained in step 82 with the remaining frame number obtained in step 83 (step 84). If the remaining frame number is smaller, then since this signifies that coding processing comes to an end intermediately of the next GOP, the current GOP and the following GOP, that is, the last GOP, are coupled. In this instance, the new GOP is formed regarding an I picture in the last GOP as a P picture (step 85). The concept in step 85 is illustrated in FIG. 12. Then, the control parameter setting section gets total numbers of I pictures, P pictures and B pictures in the GOP (step 86). In any other of the GOP than the top, the numbers of those I, P and B pictures in the current GOP for which no coding processing has been performed are discriminated (step 87). Then, aimed code amounts for the current frame are determined (step 88).

As an example of a method of determining an aimed code amount, the Test Model 5 (TM5) of the Test Model Editing Committee of the well-known ISO-IEC/JTC1/SC29/WG11 will be described. In the TM5, aimed code amounts of the pictures are calculated using the equations (1) to (5) below:

$$R = G + R \tag{1}$$

$$Ti = \max\left( \frac{R}{1 + \frac{Np}{Kp} \cdot \frac{Xp}{Xi} \cdot \frac{Nb}{Kb} \cdot \frac{Xb}{Xi}}, \frac{bit\_rate}{8 \cdot picture\_rate} \right) \tag{2}$$

$$Tp = \max\left( \frac{R}{Np + \frac{Nb \cdot Kp}{Kb} \cdot \frac{Xb}{Xp}}, \frac{bit\_rate}{8 \cdot picture\_rate} \right) \tag{3}$$

$$Tb = \max\left( \frac{R}{Nb + \frac{Np \cdot Kb}{Kp} \cdot \frac{Xp}{Xb}}, \frac{bit\_rate}{8 \cdot picture\_rate} \right) \tag{4}$$

$$R = R - S \tag{5}$$

where the function max(A, B) is a function of comparing A and B with each other and outputting the value of a higher one of A and B; further, R has an initial value 0, and Kp=1.0, Kb=1.4, and here, the values Kp and Kb are empirically determined values; Xt is a product of an average value in Q scale of t preceding pictures (t=I, P, B) and a code amount in the preceding one frame of the same picture type; Nt is the number of t pictures (t=I, P, B) remaining in the GOP; S is a generated code amount of the frame for which coding processing has been performed; G=(bit_rate×N)/picture_rate; and N is the number of frames in one GOP. The equation (1) is used only at the top of a GOP, and the equations (2) to (4) are used before coding of each frame is performed whereas the equation (5) is used after coding of each frame is performed. Consequently, an aimed code amount Tx (x=I, P, B) for each picture can be determined.

Thereafter, the Q scale of the macroblocks is calculated using the equations (6) to (12) below:

$$r = 2 \times bit\_rate/picture\_rate \quad (6)$$

$$d0i = dji = 10 \times r/31 \quad (7)$$

$$d0p = djp = Kp \times d0i \quad (8)$$

$$d0b = djb = Kb \times d0i \quad (9)$$

$$Qj = dji \times 31/r \quad (10)$$

$$djx = d0x + B - Tm \times mbnum/Mb\_cnt \quad (11)$$

$$d0x = djx \quad (12)$$

where B is a generated code amount up to the preceding macroblock in the current frame; mbnum is a total number of macroblocks coded already; and Mb cnt_is a total number of macroblocks in one frame. The equations (6) to (9) are used only for the first frame of picture data of an object of compression, and the equations (10) and (11) are used before coding of each macroblock is performed whereas the equation (12) is used after coding of each frame is performed. The Q scale of the macroblocks can be determined in this manner.

Figure 13:
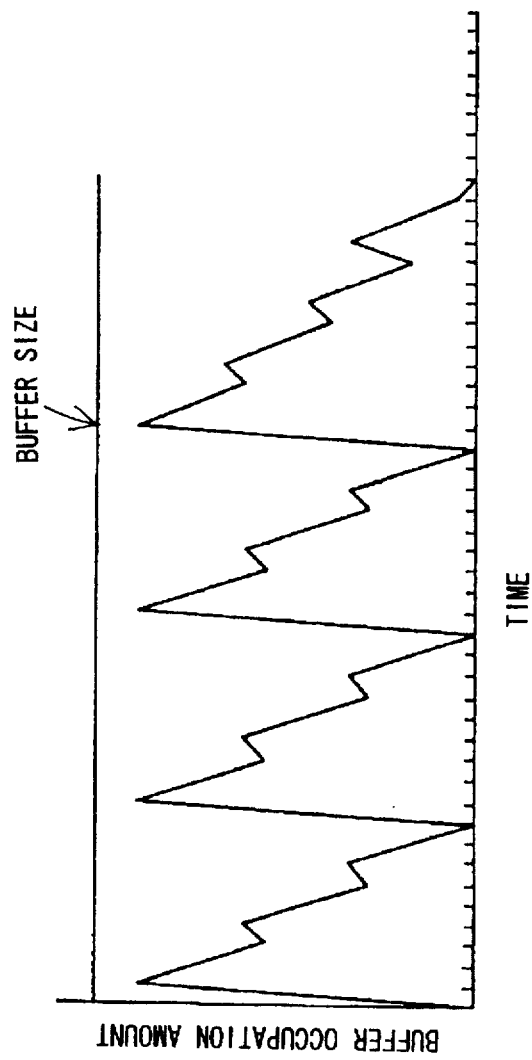
FIG. 13 is a diagram illustrating a variation of the occupation amount of a buffer when the code amount controlling method of the present invention is employed.

A variation in state of the buffer 22 when coding is performed using the Q scale determined in this manner is illustrated in FIG. 13.

Figure 14:
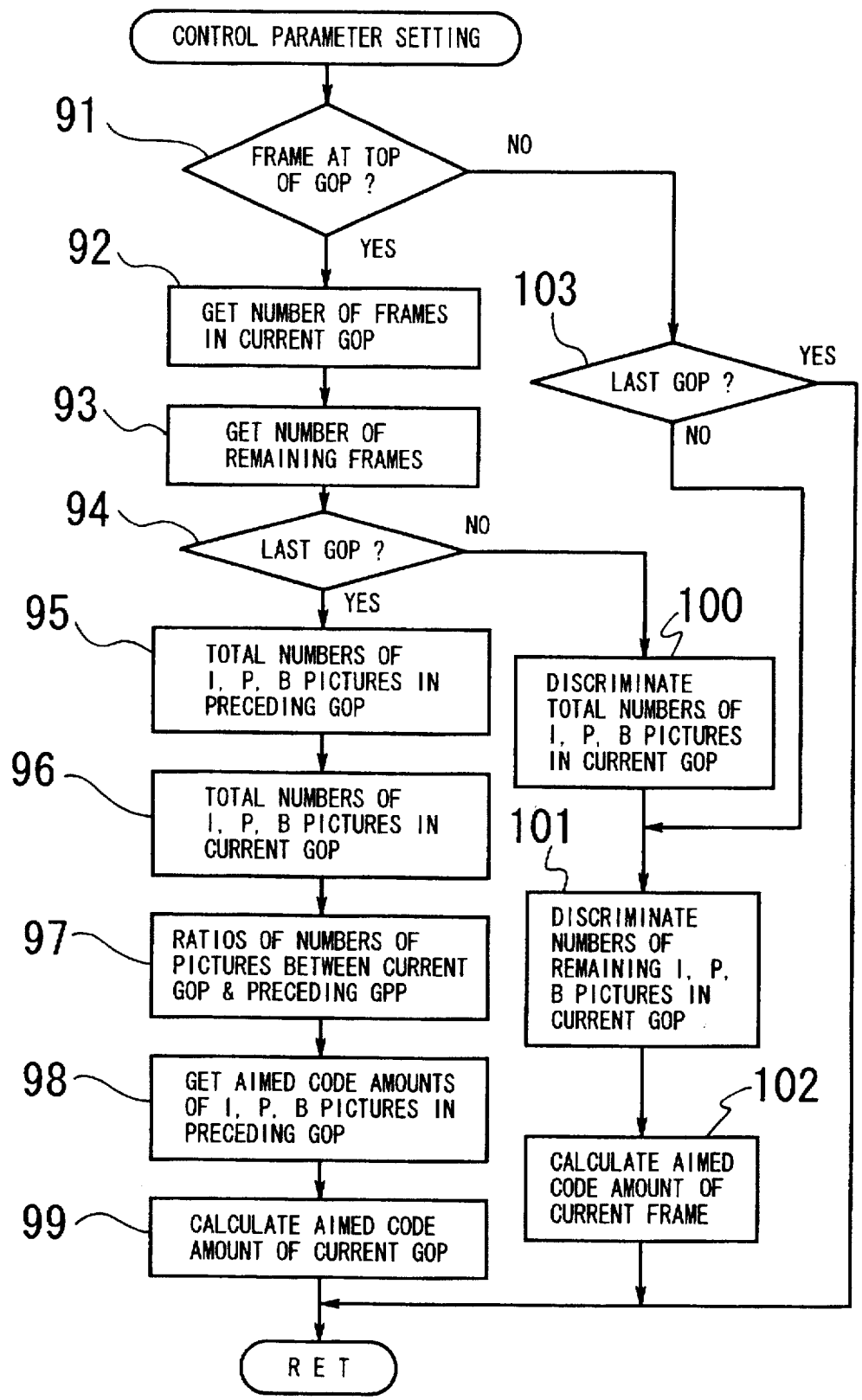
FIG. 14 is a flow chart illustrating another control parameter setting process.

Subsequently, operation of the control parameter setting section to set aimed code amounts in the last GOP will be described. FIG. 14 illustrates, in flow chart, operation of the control parameter setting section in this instance. Referring to FIG. 14, it is first discriminated whether or not a current frame is the top frame of a GOP (step 91). If the current frame is the top frame of the GOP, then the control parameter setting section gets the number of frames in the current GOP (step 92). Then, the control parameter setting section gets the number of remaining frames from among all frames of the picture data of an object of compression for which coding processing has not been performed (step 93). Thereafter, the control parameter setting section discriminates whether or not the current GOP is the last GOP (step 94). If the current GOP is the last GOP, then the control parameter setting section gets total numbers of I pictures, P pictures and B pictures in the preceding (second last) GOP (step 95). Then, the control parameter setting section gets the total numbers of I pictures, P pictures and B pictures in the current GOP (step 96). Then, the control parameter setting section calculates the ratios of the numbers of the different pictures between the current GOP and the preceding GOP (step 97). Then, the control parameter setting section gets aimed code amounts for the I, P and B pictures of the preceding GOP (step 98). Thereafter, the control parameter setting section calculates aimed code amounts of the different pictures for the current GOP from the ratios of the numbers of the different pictures calculated in step 97 and the aimed code amounts of the individual pictures gotten in step 98 using the following equation (13) (step 99):

$$Tx = Tx' \times (Nx/Nx') \quad (13)$$

where Tx' (x=I, P, B) is an aimed code amount of each picture of the preceding GOP, Nx (x=I, P, B) is a total number of pictures of each picture type in the current GOP, and Nx' (x=I, P, B) is a total number of pictures of each picture type in the preceding GOP. From the above, an aimed code amount Tx (x=I, P, B) of each picture in the current GOP can be calculated.

On the other hand, when it is discriminated in step 94 that the current GOP is not the last GOP, the control parameter setting section gets total numbers of the I, P and B pictures in the current GOP (step 100). Then, the control parameter setting section discriminates the numbers of the I, P and B pictures remaining in the current GOP (step 101). Then, the control parameter setting section calculates an aimed code amount for the current frame (step 102). As a method of calculating the aimed code amount, for example, the equations (1) to (5) given hereinabove are used.

In the meantime, when it is discriminated in step 91 that the current frame is not the top of the GOP, the control parameter setting section discriminates whether or not the current frame is a frame in the last GOP (step 103). If the current frame is not a frame in the last GOP, then the control sequence advances to step 102. On the contrary if the current frame is a frame in the last GOP, the processing is ended.

Figure 15:
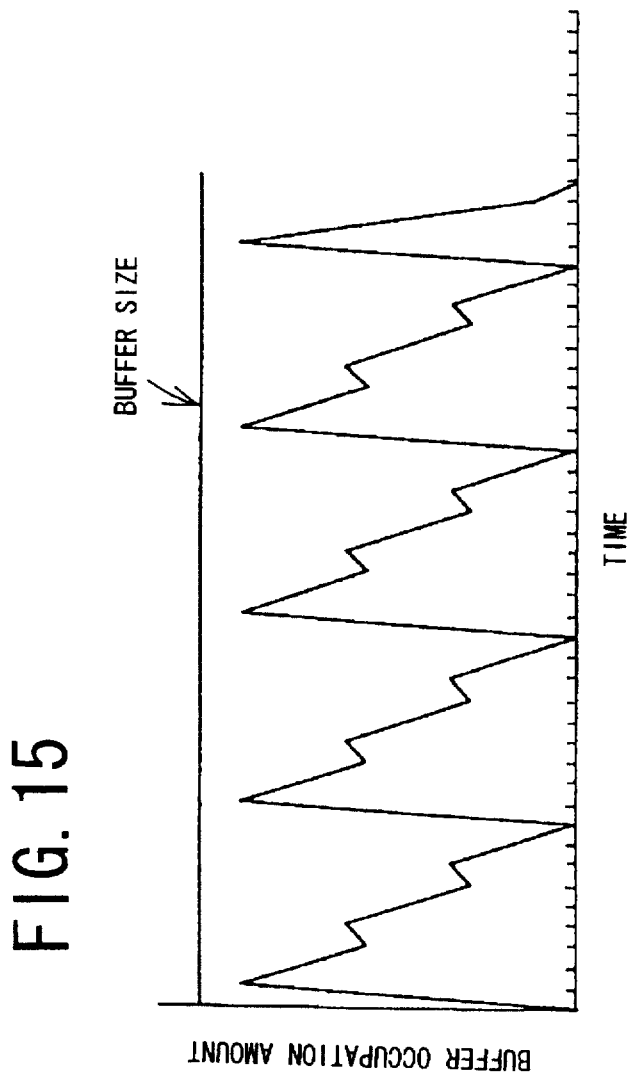
FIG. 15 is a diagram illustrating another variation of the occupation amount of a buffer when the code amount controlling method of the present invention is employed.

Thereafter, a Q scale for the macroblocks is calculated from the aimed code amount thus obtained using the equations (6) to (12). A variation in state of the buffer 22 when coding is performed using the Q scale obtained in this manner is illustrated in FIG. 15.

Having now fully described the invention, it will be apparent to one of ordinary skill in the art that many changes and modifications can be made thereto without departing from the spirit and scope of the invention as set forth herein.

What is claimed is:

1. In a code amount controlling method for a coded picture signal wherein an intra-frame coded picture is produced by dividing the code picture signal into a plurality of blocks, performing discrete cosine transform for each of the blocks, quantizing a transform output, and variable length coding the thus quantized transform output to produce an intra-frame coded picture, whereas an inter-frame coded picture is produced by detecting, for each of the blocks, a block with which a difference of a current frame from another frame preceding in time to the current frame or from frames preceding and following in time to the current frame exhibits a low value, performing motion compensation for the block, performing discrete cosine transform for difference values between blocks of the current frame and motion compensated blocks, quantizing a transform output, and variable length coding the quantized transform output, and a plurality of Groups of Pictures (GOPs) each of which is a group of frames having a frame structure wherein inter-frame coded pictures successively appear by a plurality of frames after an intra-frame coded picture is produced successively, the improvement wherein a frame structure of each of the GOPs is examined to detect whether or not the frame structure of the last GOP is different from the frame structure of the other GOPs and whether or not coding processing comes to an end intermediately of the last GOP.

2. In a code amount controlling method for a coded picture signal wherein an intra-frame coded picture is produced by dividing the code picture signal into a plurality of blocks, performing discrete cosine transform for each of the blocks, quantizing a transform output, and variable length coding the thus quantized transform output to produce an intra-frame coded picture, whereas an inter-frame coded picture is produced by detecting, for each of the blocks, a block with which a difference of a current frame from another frame preceding in time to the current frame or from frames preceding and following in time to the current frame exhibits a low value, performing motion compensation for the block, performing discrete cosine transform for difference values between blocks of the current frame and motion compensated blocks, quantizing a transform output, and variable length coding the quantized transform output, and a plurality of Groups of Pictures (GOPs) each of which is a group of frames having a frame structure wherein inter-frame coded pictures successively appear by a plurality of frames after an intra-frame coded picture is produced successively, the improvement wherein a frame structure of each of the GOPs is examined to detect whether or not the frame structure of the last GOP is different from the frame structure of the other GOPs and coding processing comes to an end intermediately of the last GOP and wherein, when the last GOP has a frame structure wherein coding processing comes to an end intermediately of the last GOP, the last GOP and a directly preceding GOP are coupled to reduce the amount of codes to be generated.

3. In a code amount controlling method for a coded picture signal wherein an intra-frame coded picture is produced by dividing the code picture signal into a plurality of blocks, performing discrete cosine transform for each of the blocks, quantizing a transform output, and variable length coding the thus quantized transform output to produce an intra-frame coded picture, whereas an inter-frame coded picture is produced by detecting, for each of the blocks, a block with which a difference of a current frame from another frame preceding in time to the current frame or from frames preceding and following in time to the current frame exhibits a low value, performing motion compensation for the block, performing discrete cosine transform for difference values between blocks of the current frame and motion compensated blocks, quantizing a transform output, and variable length coding the quantized transform output, and a plurality of Groups of Pictures (GOPs) each of which is a group of frames having a frame structure wherein inter-frame coded pictures successively appear by a plurality of frames after an intra-frame coded picture is produced successively, the improvement wherein a frame structure of each of the GOPs is examined to detect whether or not the frame structure of the last GOP is different from the frame structure of the other GOPs and coding processing comes to an end intermediately of the last GOP and wherein, when the last GOP has a frame structure wherein coding processing comes to an end intermediately of the last GOP, an aimed code amount of the last GOP is calculated from an aimed code amount of a directly preceding GOP to reduce the number of codes to be generated.

4. A coding apparatus for providing coded picture signals in accordance with a predetermined format, comprised of Groups of Pictures ("GOP") wherein each GOP is composed of various frames, comprising:

a buffer, and a means for examining a frame structure of each of the GOPs to detect whether or not the frame structure of the last GOP is different from the frame structure of the preceding GOPs.

5. A coding apparatus according to claim 4 wherein said coding apparatus further comprises a means for coupling the last GOP to a directly preceding GOP when the last GOP has a frame structure which is different from the frame structure of the preceding GOPs.

6. A coding apparatus according to claim 4 wherein said coding apparatus further comprises a means for calculating an aimed code amount for the last GOP from an aimed code amount of a directly preceding GOP when the last GOP has a frame structure which is different from the frame structure of the preceding GOPs.

* * * * *